March 15, 1932. G. H. HAINES 1,849,187
MIXING APPARATUS
Filed Jan. 6, 1931
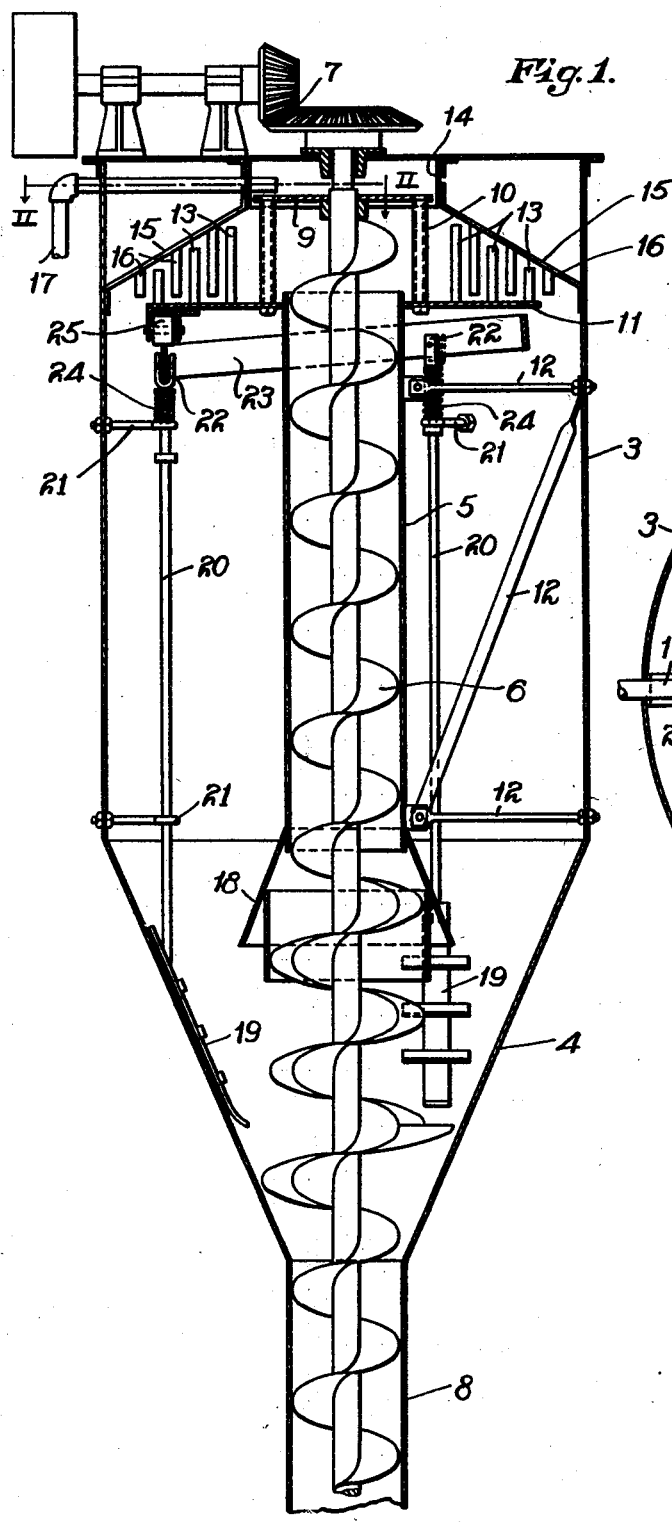
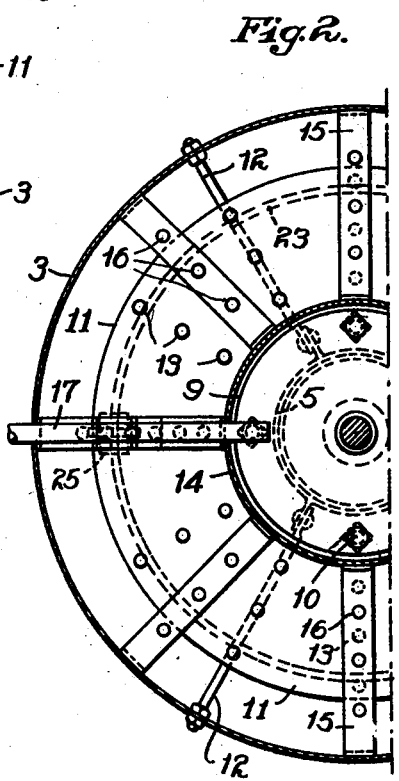
INVENTOR
George H. Haines
By Archworth Martin
attorney Patented Mar. 15, 1932

1,849,187

UNITED STATES PATENT OFFICE

GEORGE H. HAINES, OF CALEDONIA, OHIO, ASSIGNOR TO THE GRAIN MACHINERY COMPANY, OF MARION, OHIO, A CORPORATION OF OHIO

MIXING APPARATUS

Application filed January 6, 1931. Serial No. 506,945.

My invention relates to mixing apparatus, and is more particularly designed for employment in the mixing of feed for live stock, but it is susceptible also of use in the mixing of other materials.

One object of my invention is to provide apparatus that will mix material more effectively then various types of devices heretofore employed.

Another object of my invention is to provide a mixing apparatus especially suited for stirring and mixing dry feeds containing a liquid such as molasses, for example.

Still another object of my invention is to simplify and improve generally the structure and operation of mixing apparatus.

One form which my invention may take is shown in the accompanying drawings wherein Figure 1 is a vertical sectional view through the apparatus, and Fig. 2 is a sectional plan view taken on the line II—II of Fig. 1.

The mixing chamber is designated by the numeral 3 and has a hopper-like portion 4, and contains a central conduit 5. A screw conveyer 6 turns within the conduit 5 to elevate material from below the mixing chamber upwardly through the conduit. The material which may be mill feed of various kinds is discharged somewhat in the form of a spray at the upper open end of the conduit 5, and will fall or find its way to the hopper 4 and thus be circulated through the conduit for so long a period as is necessary in order to effect proper mixture or intermingling of the ingredients. The screw conveyer 6 is driven from a suitable source of power through bevel bears 7.

A conduit or like extension 8 of the hopper 4 is supplied with material from any suitable source such, for example, as by means shown in my Patent No. 1,721,553, issued July 23, 1929, or in any other suitable manner. The lower portion of the screw conveyer, of course, feeds the material upwardly from the conduit 8 until the chamber 3 is sufficiently charged, the upper level of material in the chamber 3 usually being somewhat below the upper or discharge end of the conduit 5.

A plate 9 is secured to the upper end of the shaft of the conveyer 6, and bolts 10 depend therefrom and support a plate or disc 11 which, during rotation of the conveyer, is rotatable about the upper end of the conduit 5, the conduit being rigidly supported in position by means of brackets or brace rods 12. The disc 11 carries a series of radially-spaced upwardly-extending fingers 13.

A hood-like bracket member 14 is supported from the cover of the chamber 3 and carries a series of bars 15 that support fingers 16 which are spaced radially of the fingers 13, so that during rotation of the screw, the fingers 13 will pass between the fingers 16.

Molasses or other liquid is supplied through a pipe 17 and discharges upon the upper side of the plate 9 from whence it will flow or fall to the disc 11 and be intermingled with the dry feed material that is discharged from the upper end of the conduit 5. The molasses and the dry feed will be intermixed somewhat by the fingers 13 and 16, as the materials move across the face of the plate under centrifugal action to fall from the peripheral edge thereof.

The fingers 13 and 16 not only assist in mixing the materials, but they prevent the formation of sticky masses or lumps of the material. The mixture of molasses and dry feed material is circulated through the conduit 5 as above-indicated until thorough intermingling thereof is effected.

To prevent clogging of the materials in the restricted space between the hopper 4 and the lower flared end 18 of the conduit, I provide agitating members 19 which are supported by reciprocable rods 20 operating in guides 21. The upper ends of the rods 20 are pivotally connected through yokes 22 to a floating ring 23, springs 24 being interposed between the upper guide members 21 and the yokes 22 to normally raise the rods 20 and the agitators to their uppermost positions.

The disc 11 carries a roller 25 which bears upon the upper edge of the ring 23, so that as the conveyer shaft rotates the roller will ride along the upper edge of the ring 23 and depress the same against the springs 24. It will be seen that as the roller passes from a point above one spring 24, such spring will be permitted to elevate its associated rod 20 and thus move the agitator 19 carried thereby upwardly.

Reciprocatory movements in a vertical direction are thus imparted to the agitators 19 so that they will break up any accumulation of material which tends to become compacted between the flared end 18 of the conduit and the hopper and to exert a downward feeding movement thereon, so that the material can be caught by the conveyer 6 and again carried upwardly through the conduit.

This reciprocating movement of the agitators 19 insures the breaking up and advance of the mass of material with a small amount of power as compared to rotary agitators which are moved through materials in circular paths to effect a stirring action.

Referring again to the fingers 13 and 16, various other means could be provided for effecting proper movement of the material at the upper portion of the chamber. For example, the fingers 13 could be eliminated.

The molasses which enters through the pipe 17 is discharged from the peripheral edge of the plate 9 in the form of a spray or thin stream which is caught by the dry feed contained on the disc 11 so that the molasses is somewhat thinly spread upon the feed instead of being deposited thereon in a mass at localized points.

I claim as my invention:—

1. The combination with a mixing chamber, of means for circulating dry material through said chamber, in vertical and horizontal paths, and a mechanical stirrer in the upper portion of said chamber for mixing another material with said dry material during circulatory movement of the dry material through a horizontal path, the second-named material being deposited on the said dry material from a point above said horizontal path of movement thereof.

2. The combination with a mixing chamber, of means for effecting circulatory movement of dry material therein through vertical paths, a receiving surface across which the material moves during said movement, and means in the upper portion of said chamber for introducing liquid material therethrough, comprising a plate-like member positioned to receive the liquid material and cause it to flow from the edges thereof into the dry material contained on said surface.

3. The combination with a mixing chamber, of means for effecting circulatory movement of dry material therein through vertical paths, a receiving surface across which the material moves during said movement, and means in the upper portion of said chamber for introducing liquid material therethrough, comprising a plate-like member positioned to receive the liquid material and cause it to flow from the edges thereof into the dry material contained on said surface, together with means for rotating said plate.

4. Mixing apparatus comprising a mixing chamber, a vertically-disposed conduit within said chamber, means for advancing dry material upwardly through said conduit and to discharge it from the upper end thereof, a plate-like surface positioned in the upper portion of the chamber to receive the material discharged from said conduit, means for supplying liquid material to the dry material while on said plate, and means for discharging the intermingled material from said surface to permit such materials to fall to the lower portion of the chamber.

5. Mixing apparatus comprising a mixing chamber, a vertically-disposed conduit within said chamber, means for advancing dry material upwardly through said conduit and to discharge it from the upper end thereof, a plate-like surface positioned in the upper portion of the chamber to receive the material discharged from said conduit, means for supplying liquid material to the dry material while on said plate, means cooperating with said plate for agitating the materials while on said plate, and means for discharging the mixed material from said surface to permit such materials to fall to the lower portion of the chamber.

6. Mixing apparatus comprising a mixing chamber, a conduit disposed centrally of said chamber, means for advancing material upwardly through said conduit and discharging it from the upper end thereof, a plate-like surface for receiving the discharged material, means for depositing another material on the discharging material, and means for rotating said surface, whereby to discharge the intermingled materials from said surface.

7. Mixing apparatus comprising a mixing chamber, a conduit disposed centrally of said chamber, a screw conveyer for advancing dry material upwardly through said conduit and discharging it from the upper end thereof, a plate-like surface for receiving the discharged material, a second plate-like surface positioned above the first-named plate for depositing another material in the form of a spray on the said dry material while on said first-named plate, and stirring members supported above said first-named plate in position to engage material deposited thereon.

8. Mixing apparatus comprising a mixing chamber, a conduit disposed centrally of said chamber, a screw conveyer for advancing dry material upwardly through said conduit and discharging it from the upper end thereof, a plate-like surface for receiving the discharged material, a second plate-like surface of less diameter than said material-receiving plate and positioned above the same, for depositing another material on the said dry material while on said receiving plate, stirring members positioned to engage material deposited on said receiving plate, and stirring members carried by said receiving plate and cooperating with the first-named stirring members to effect intermixing of the material.

9. Mixing apparatus comprising a mixing chamber, a conduit vertically-disposed within said chamber, a rotatable screw conveyer in said conduit for advancing material upwardly therethrough, agitator means disposed exteriorly of said conduit and adjacent to the lower end thereof, means for supporting said agitator means for vertical reciprocatory movement, and a cam-operating connection betwen said screw conveyer and said agitator.

10. Mixing apparatus comprising a mixing chamber, a conduit vertically-disposed within said chamber, a rotatable screw conveyer in said conduit for advancing material upwardly therethrough, agitator means disposed exteriorly of said conduit and adjacent to the lower end thereof, means for supporting said agitator means for vertical reciprocatory movement, means for normally yieldably urging said agitator means in an upward direction, and means rotatable with said screw conveyer for periodically depressing said agitator means, during rotation of said screw conveyer.

11. Mixing apparatus comprising a mixing chamber, a conduit vertically-disposed within said chamber, a rotatable screw conveyer in said conduit for advancing material upwardly therethrough, a plurality of agitator devices disposed exteriorly of said conduit and adjacent to the lower end thereof, means for supporting said devices for vertical reciprocating movement, a member rotatable with said screw, and means carried by said member for periodically reciprocating each of said devices.

12. Mixing apparatus comprising a mixing chamber, a conduit vertically-disposed within said chamber, means for advancing material upwardly through said conduit and discharging it from the upper end thereof, agitator means disposed exteriorly of the said conduit and adjacent to the lower end thereof, means for supporting the said agitator means for vertical reciprocatory movement, yieldable means for periodically moving said agitator in one direction, and means actuated by the material advancing means for periodically moving the said agitator in the opposite direction.

13. Mixing apparatus comprising a mixing chamber, a vertically-disposed conduit within said chamber, means for advancing dry material upwardly through said conduit and to discharge it from the upper end thereof, a plate-like surface positioned in the upper portion of the chamber to receive the material discharged from said conduit, a second plate-like surface rotatably supported above the first-named plate, and arranged for depositing another material in the form of a spray therefrom onto the said dry material while on said first-named plate, and means for rotating each of said plates for moving the materials thereon across the same to permit such materials to fall.

14. Mixing apparatus comprising a mixing chamber, a vertically-disposed conduit within said chamber, means for advancing dry material upwardly through said conduit and to discharge it from the upper end thereof, a plate-like surface positioned in the upper portion of the chamber to receive the material discharged from said conduit, a second plate-like surface rotatably supported above the first-named plate, and arranged for depositing another material in the form of a spray therefrom onto the said dry material while on said first-named plate, and means for rotating each of said plates for moving the materials thereon across the same to permit such materials to fall, the said second-named plate being of less diameter than the said first-named plate.

In testimony whereof I, the said GEORGE H. HAINES have hereunto set my hand.

GEORGE H. HAINES.